Patented Apr. 8, 1952

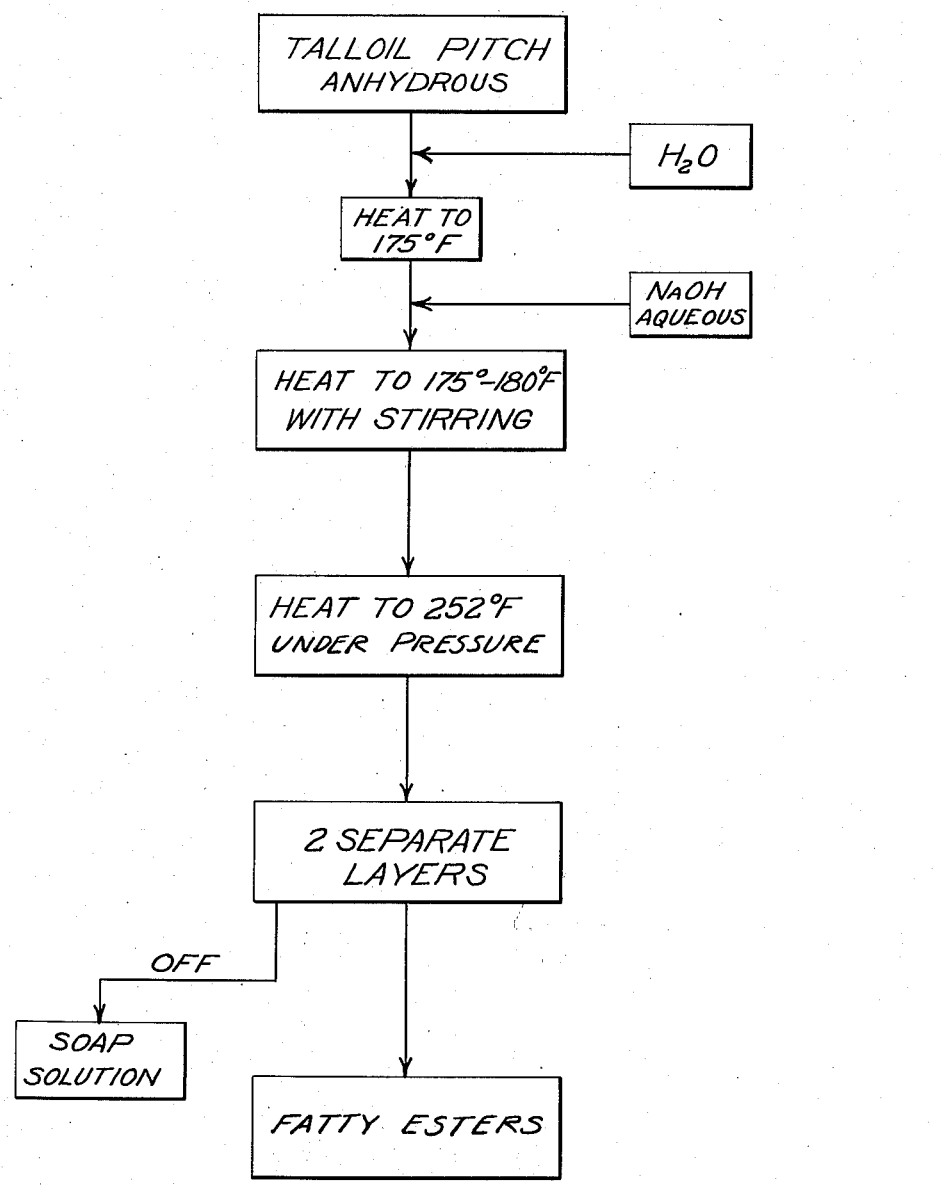

2,591,885

UNITED STATES PATENT OFFICE 2,591,885

PURIFICATION OF TALL OIL PITCH

Roscoe S. Smith, Tuscaloosa, Ala., assignor to West Virginia Pulp & Paper Company, New York, N. Y., a corporation of Delaware Application August 25, 1949, Serial No. 112,311

4 Claims. (Cl. 260—97.7)

My present invention relates to the purification of tall oil pitch and to a product of such purification. One method of tall oil purification which has found extensive use involves distillation of the crude oil, subjecting the distillate to standing with formation of crystals of rosin acids, and separation thereof from the mother liquor which may then, if desired, be redistilled. The tailings, or bottoms, from each distillation step consist of pitch which although useful for many purposes has a comparatively low market value.

I have now discovered that upon treatment of the tall oil pitch with a dilute aqueous alkaline solution capable of reacting with tall oil acids to form soluble soaps therewith it is possible to cause the pitch to separate into two layers, of which the upper consists chiefly of ester compounds and the greater portion of the naturally occurring unsaponifiables in the tall oil, whereas the lower aqueous layer contains soaps of fatty and rosin acids and the balance of the unsaponifiables. Because of the high temperature to which the tall oil is heated during the first distillation opportunity is given for esterification to take place between the naturally occurring alcohols, e. g. $\beta$-sitosterol and others and the fatty acids, the formed esters being contained in the pitch component. Substantially no esters are formed with the rosin acids. The following example will serve further to explain the invention, reference being had to the annexed flow sheet:

360 grams of tall oil pitch derived from the distillation of crude tall oil and 8400 grams of water were placed in a battery jar. The pitch and water mixture were heated to 175° F. in a water bath to render the pitch fluid, whereupon 300 grams of 98% sodium hydroxide dissolved in 2100 grams of water was added. The mixture was reheated to 175–180 F. with stirring and then placed in a pressure vessel and kept there for a total time of 35 hours, of which 0.9 hours were 252° F., the remainder at room temperature. The mixture separated into two layers. The lower layer containing the solution of fatty and rosin acid soaps together with some unsaponifiables was then siphoned off. The amount of esters obtained was equal to 33% by weight of the pitch started with. This yield will vary with the conditions under which the layers are allowed to separate. For example, markedly less sodium hydroxide or markedly more sodium hydroxide will cause a decreased yield. It is obvious that sufficient hydroxide must be added to saponify the free fatty acids present. A slight excess seems to help the yield, by causing the reaction to go to completion, whereas a marked excess apparently attacks the esters and reduces their yield by saponification. Furthermore a marked excess of alkali will also defeat the purpose of the invention by causing the soaps to salt out. The concentration of the sodium hydroxide amounted to approximately 3% which was found to be satisfactory. Other results are as follows:

Separation data

| Run No. | Time of Heating-Hours | | Maximum Temp. °F. | Fatty Acid Esters Yield Dry Basis Per cent of Charge | Excess NaOH Used Over Theoretical Per cent |
|---|---|---|---|---|---|
| | Over 210° F. | At Maximum Temp. | | | |
| 3 | 7.3 | 4.3 | 244 | 30 | 87 |
| 4 | 6.5 | 4.0 | 253 | 30 | 87 |
| 6 | 1.5 | 0.9 | 249 | 28 | 87 |
| 7 | 0.9 | 0.1 | 249 | 27 | 87 |

No separation occurred in runs 1 and 2 where the amount of sodium hydroxide used was 43% in excess of that theoretically required. Run 5 was that first described.

The use of sodium carbonate or of the alkali metal or ammonium hydroxides or carbonates in lieu of sodium hydroxide may also be had. Whatever alkali is used the quantity should be such as to cause the reaction to go to as near completion as possible. By the use of a solution of sodium carbonate or other alkali weaker than an alkali metal hydroxide less tendency is had to break the esters present.

The temperature at which the mixture is heated above substantially 215° F. for separation does not, within limits, constitute a major factor in the yield. Thus nothing in the temperature range of from 215° to 268° F. (the highest tested) was found to be critical. In general, if atmospheric pressures are used best results are had when the temperature is maintained close to the boiling point, as for example 217° F. The mixture, however, should not be allowed to boil. The yield was as great as when superatmospheric pressures were used but longer times of heating were necessary, i. e. four hours as a minimum.

The manner of heating the mixture of tall oil pitch and saponifying solution may be subject to wide variation. For example, the mixture may be placed in a tank provided with a stirrer, pumped therefrom through a heat exchanger under pressure and thence to a receiver where it is maintained at the desired temperature. When separation of the layers is complete, the aqueous layer containing the soap in solution may be siphoned off. The ester may then be dried in an oven at 212° F. In so proceeding the best yield was obtained when the mixture was exposed to a temperature of 260;

268° F. for 19 minutes; the yield was 29.1% of esters.

The ester material obtained by the separation had an approximate analysis as follows:

*Analysis of esters from pitch*

| | |
|---|---|
| Acetyl number | 11 |
| Moisture, percent | 0.3 |
| Total acids (combined and free), percent | 46.7 |
| Total unsaponifiables (combined and free), percent | 54.7 |
| Iodine number | 133 |
| Acid number | 5 |
| Saponification number | 71 |
| Rosin acids number | 2 |
| Sitosterol in unsaponifiables, percent | 38.8 |
| Specific gravity 25° C./25° C. | 0.961 |

The acetyl number of 11 indicates the presence only a small number of free hydroxyl groups. The ester containing nearly 22% of beta sitosterol constitutes an important source of this material. The rosin acid number of 2 indicates an almost complete absence of rosin acids for the ester. Solubility tests showed that the esters were soluble in hydrocarbons, chlorinated hydrocarbons, pyridine, ethyl ether, and carbon disulfide. They were insoluble in more polar solvents, such as water, alcohols, and amines.

The iodine number of 133 indicates considerable unsaturation and is consistent with the fact that the ester dries in the presence of sunlight or catalysts with non-tacky film. The ester product resembles a crude lanolin in its ability to stabilize water-in-oil emulsions and has many potential uses.

The composition of the pitch started with was as follows:

| | Percent |
|---|---|
| Rosin acids | 34 |
| Fatty acids | 41 |
| Non-acids | 25 |

The composition of the ester layer after saponification for runs 3 to 7 inclusive in fatty acids and non-acids was as follows:

*Fatty acid esters, percent*

| Run | Rosin Acids | Fatty Acids[1] | Non-Acids |
|---|---|---|---|
| 3 | Negligible | 48.1 | 51.9 |
| 4 | do | 51.5 | 48.5 |
| 5 | do | 42.8 | 57.2 |
| 6 | do | 46.4 | 53.6 |
| 7 | do | 48.0 | 52.0 |

[1] Calculated by difference.

In each case the amount of rosin acids present was negligible. When the aqueous layer was acidified to recover a residual pitch, the composition thereof was as follows:

*Residual pitch, percent*

| Run | Rosin Acids | Fatty Acids | Non-Acids |
|---|---|---|---|
| 3 | 50.1 | 37.2 | 12.7 |
| 4 | 50.2 | 35.8 | 14.0 |
| 5 | 51.5 | 35.0 | 13.5 |
| 6 | 47.1 | 39.7 | 13.2 |
| 7 | 48.2 | 38.4 | 13.4 |

The improved process lends itself to use in the overall process of refining tall oil. For example, the aqueous layer separated may be processed to recover the fatty and rosin acids by acidification and salting out in the usual manner of recovering tall oil from soap, and the so-recovered acids added to the feed stock to the tall oil stills. If it is desired to recover the higher alcohols from the ester layer, as by splitting the esters by known methods, the fatty acids so obtained may either be used as such, or may also be added to the feed stock to the tall oil stills. Alternatively the separated aqueous layer may simply be added to the crude tall oil soaps or skimmings as obtained in the operation of concentrating black liquor containing tall oil soaps which are processed for recovery of tall oil by the usual methods of acidification and salting out.

I claim:

1. The method of treating tall oil pitch consisting in forming a mixture of said pitch and a dilute aqueous alkaline solution capable of reacting with tall oil acids to form water soluble soaps therewith, such alkali source being in moderate excess of that corresponding to the acid number of said pitch, allowing the mixture to stand at a temperature close to the boiling point of said mixture, but without causing the same to boil until separation takes place of an upper oil layer, separating same from a lower aqueous layer containing fatty acid soaps and recovering the insoluble upper layer consisting largely of fatty acid esters of alcohols originally present in the tall oil pitch.

2. The method according to claim 1 in which the formation of the ester layer is brought about by maintaining the temperature thereof above 215° F. under sufficient superatmospheric pressure to prevent boiling.

3. The method of refining tall oil which consists in distilling same to give a refined product and pitch, treating said pitch as per claim 1, separating the ester layer, splitting the soaps in the soap layer to recover the fatty and rosin acids therein, adding same to the tall oil about to undergo distillation, and distilling the mixture.

4. A product made according to the process of claim 1 resembling lanolin in physical and chemical properties recovered from tall oil pitch, the same consisting of esters of naturally occurring fatty acids with the naturally occurring alcohols, said product having the ability to stabilize water-in-oil emulsions.

ROSCOE S. SMITH.

REFERENCES CITED

The following references are of record in the file of this patent:

UNITED STATES PATENTS

| Number | Name | Date |
|---|---|---|
| 2,280,815 | Fernholz | Apr. 28, 1942 |
| 2,334,762 | Hasselstrom | Nov. 23, 1943 |
| 2,396,646 | Dressler | Mar. 19, 1946 |
| 2,487,000 | Taylor | Nov. 1, 1949 |

FOREIGN PATENTS

| Number | Country | Date |
|---|---|---|
| 89,182 | Sweden | May 4, 1937 |